US012749432B2

(12) United States Patent
Oh et al.

(10) Patent No.: US 12,749,432 B2
(45) **Date of Patent: *Sep. 29, 2026**

(54) DISPLAY DEVICE HAVING PLURALITY OF INITIALIZATION POWER SOURCES

(71) Applicant: SAMSUNG DISPLAY CO., LTD., Yongin-si (KR)

(72) Inventors: Kyong Hwan Oh, Yongin-si (KR); Jin Tae Jeong, Yongin-si (KR); Ji Hyun Ka, Yongin-si (KR); Won Kyu Kwak, Yongin-si (KR); Hyung Jun Park, Yongin-si (KR); Chang Soo Pyon, Yongin-si (KR); Ji Eun Lee, Yongin-si (KR); Hai Jung In, Yongin-si (KR); Won Mi Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 145 days.

This patent is subject to a terminal disclaimer.

(21) Appl. No.: 18/915,292

(22) Filed: Oct. 14, 2024

(65) Prior Publication Data

US 2025/0037650 A1 Jan. 30, 2025

Related U.S. Application Data

(63) Continuation of application No. 18/231,719, filed on Aug. 8, 2023, now Pat. No. 12,118,924, which is a (Continued)

(30) Foreign Application Priority Data

Dec. 30, 2019 (KR) ........................ 10-2019-0178321

(51) Int. Cl.

*G09G 3/32* (2016.01)
*G09G 3/3233* (2016.01)

(52) U.S. Cl.

CPC ............. *G09G 3/32* (2013.01); *G09G 3/3233* (2013.01); *G09G 2310/0278* (2013.01); *G09G 2330/028* (2013.01)

(58) Field of Classification Search

CPC .................. G09G 3/32; G09G 3/3233; G09G 2310/0278; G09G 2330/028;

(Continued)

(56) References Cited

U.S. PATENT DOCUMENTS

| | | | |
|---|---|---|---|
| 10,242,622 | B2 | 3/2019 | Tseng et al. |
| 10,553,663 | B2 | 2/2020 | Choi et al. |

(Continued)

FOREIGN PATENT DOCUMENTS

| | | | |
|---|---|---|---|
| CN | 106652915 A | 5/2017 | |
| CN | 107591124 A | 1/2018 | |

(Continued)

OTHER PUBLICATIONS

Non-Final Office Action issued on May 3, 2021 in U.S. Appl. No. 17/078,088.

(Continued)

*Primary Examiner* — Vijay Shankar

(74) *Attorney, Agent, or Firm* — Womble Bond Dickinson (US) LLP

(57) ABSTRACT

A display device to operate in a unit of a first period when displaying first images at a first frequency and operate in a unit of the first period and at least one second period when displaying second images at a second frequency lower than the first frequency, the display device including a scan driver to supply a first scan signal, a second scan signal, and a third scan signal. The first to third scan signals are toggled in the first period when the first images are displayed at the first frequency, and the first to third scan signals are toggled in the first period and the third scan signal is toggled in the (Continued)

second period when the second images are displayed at the second frequency.

18 Claims, 10 Drawing Sheets

Related U.S. Application Data continuation of application No. 17/586,711, filed on Jan. 27, 2022, now Pat. No. 11,741,885, which is a continuation of application No. 17/078,088, filed on Oct. 22, 2020, now Pat. No. 11,257,422.

(58) Field of Classification Search

CPC ....... G09G 2230/00; G09G 2300/0819; G09G 2300/0842; G09G 2300/0861; G09G 2310/0262; G09G 2310/06; G09G 2310/061; G09G 3/3266; G09G 2300/0426; G09G 2300/0439; G09G 2310/0243; G09G 2320/0247

See application file for complete search history.

(56) References Cited

U.S. PATENT DOCUMENTS

| | | | | |
|---|---|---|---|---|
| 10,573,243 | B2 | 2/2020 | Choi et al. | |
| 10,651,264 | B2 | 5/2020 | An et al. | |
| 10,777,131 | B2 | 9/2020 | Kim et al. | |
| 10,861,393 | B2 | 12/2020 | Kim et al. | |
| 10,891,900 | B2 | 1/2021 | Kim et al. | |
| 10,909,918 | B2 | 2/2021 | Kim et al. | |
| 10,910,463 | B2 | 2/2021 | Choi et al. | |
| 11,024,237 | B2 | 6/2021 | Park et al. | |
| 11,257,422 | B2 | 2/2022 | Oh et al. | |
| 11,705,066 | B2 * | 7/2023 | Kang | G09G 3/3233 345/211 |
| 11,741,885 | B2 | 8/2023 | Oh et al. | |
| 11,798,465 | B2 * | 10/2023 | Kim | G09G 3/32 |
| 12,073,786 | B2 * | 8/2024 | Kang | G09G 3/3233 |
| 12,118,924 | B2 * | 10/2024 | Oh | G09G 3/32 |
| 12,148,373 | B2 * | 11/2024 | Chae | G09G 3/2007 |
| 12,475,849 | B2 * | 11/2025 | Kang | G09G 3/3233 |
| 2016/0322446 | A1 | 11/2016 | Park et al. | |
| 2019/0096330 | A1 | 3/2019 | Kim et al. | |
| 2019/0221165 | A1 | 7/2019 | Park et al. | |
| 2020/0394950 | A1 | 12/2020 | Oh et al. | |
| 2020/0394961 | A1 | 12/2020 | Kim et al. | |
| 2021/0134210 | A1 | 5/2021 | In et al. | |
| 2021/0225266 | A1 | 7/2021 | Hyun et al. | |

FOREIGN PATENT DOCUMENTS

| | | | |
|---|---|---|---|
| CN | 108694909 | A | 10/2018 |
| CN | 109545149 | A | 3/2019 |
| CN | 110047428 | A | 7/2019 |
| KR | 10-2017-0015750 | A | 2/2017 |
| KR | 10-2019-0034375 | A | 4/2019 |
| KR | 10-2019-0087695 | | 7/2019 |
| KR | 10-2016614 | | 9/2019 |
| KR | 10-2020-0142645 | | 12/2020 |
| KR | 10-2020-0142646 | | 12/2020 |
| KR | 10-2021-0054114 | | 5/2021 |
| KR | 10-2021-0092870 | | 7/2021 |

OTHER PUBLICATIONS

Non-Final Office Action issued on Aug. 8, 2022, in U.S. Appl. No. 17/586,711.

Final Office Action issued on Jan. 26, 2023, in U.S. Appl. No. 17/586,711.

Notice of Allowance issued on Apr. 5, 2023, in U.S. Appl. No. 17/586,711.

* cited by examiner

DISPLAY DEVICE HAVING PLURALITY OF INITIALIZATION POWER SOURCES

CROSS-REFERENCE TO RELATED APPLICATIONS

This is a continuation of U.S. patent application Ser. No. 18/231,719, filed Aug. 8, 2023, which application is a continuation of U.S. patent application Ser. No. 17/586,711, filed on Jan. 27, 2022, now U.S. Pat. No. 11,741,885, which is a continuation of U.S. patent application Ser. No. 17/078,088, filed on Oct. 22, 2020, now U.S. Pat. No. 11,257,422, which claims priority from and the benefit of Korean Patent Application No. 10-2019-0178321, filed on Dec. 30, 2019, the entire content of all of which is incorporated herein by reference.

BACKGROUND

Field

Embodiments of the invention relate generally to an electronic device, and more specifically, to a display device capable of improving display quality when the display device is operated using low frequencies.

Discussion of the Background

A display device displays an image on a display panel using control signals applied from an external device.

The display device may include a plurality of pixels. Each of the pixels may include a plurality of transistors, a light emitting element electrically coupled to the transistors, and a capacitor. The transistors may be turned on in response to respective signals provided through lines, thus generating driving current. The light emitting element may emit light in response to the driving current.

Recently, the need has arisen for display devices corresponding to various driving frequencies (or image refresh rates) to achieve purposes of high-resolution driving, low-power driving, three-dimensional image driving, etc.

Particularly, a method of driving display device using low frequencies has been used to enhance the driving efficiency of the display device and minimize the power consumption. Therefore, a method of improving the display quality of the display devices that are operated using low frequencies is required.

The above information disclosed in this Background section is only for understanding of the background of the inventive concepts, and, therefore, it may contain information that does not constitute prior art.

SUMMARY

Applicant discovered that when display devices are operated using low frequencies, a flicker phenomenon may occur due to hysteresis characteristics in the low-frequency driving operation that decrease image quality.

Display devices constructed according to the principles and illustrative embodiments of the invention are capable of controlling the driving transistor included in each pixel periodically to have an on-bias state or an off-bias state by supplying different initialization power sources to a first pixel row and a second pixel row, thereby improving hysteresis changes and deviation in the driving transistor characteristics. Consequently, flicker phenomenon due to hysteresis characteristics in the low-frequency driving operation may be mitigated, and the step efficiency in the high-frequency driving operation may be improved. As a result, the image quality may be enhanced.

Additional features of the inventive concepts will be set forth in the description which follows, and in part will be apparent from the description, or may be learned by practice of the inventive concepts.

According to an aspect of the invention, a display device includes: pixels coupled to first scan lines, second scan lines, emission control lines, and data lines; a first scan driver to supply a first scan signal to each of the first scan lines in a first period and a second period; a second scan driver to supply a second scan signal to each of the second scan lines in the first period without supplying the second scan signal to the second scan lines in the second period; an emission driver to supply an emission control signal to each of the emission control lines in the first period and the second period; a data driver configured to supply a data signal to each of the data lines in the first period without supplying the data signals to the data lines in the second period; and a power supply to supply a first initialization power source to each of the pixels through a first power line and to supply a second initialization power source to each of the pixels through a second power line.

The power supply may be configured to output the first initialization power source alternately at a high level and a low level in a first cycle.

The power supply may be configured to output the second initialization power source alternately at the high level and the low level in the first cycle.

The power supply may be configured to output the high level of the second initialization power source overlapping with the low level of the first initialization power source, and to output the low level of the second initialization power source overlapping with the high level of the first initialization power source.

The first cycle may correspond to two horizontal periods.

A pixel disposed on an i-th (i is a natural number) pixel row may include: a light emitting element; a first transistor including a first electrode coupled to a first node electrically coupled to a first power source to control driving current based on a voltage of a second node; a second transistor coupled between one of the data lines and the first node to be turned on by the first scan signal supplied to an i-th first scan line; a third transistor coupled between the second node and a third node coupled to a second electrode of the first transistor to be turned on by the second scan signal supplied to an i-th second scan line; a fourth transistor coupled between the first node and the first power line or between the third node and the first power line to be turned on by the first scan signal; a seventh transistor coupled between the second node and the first power line to be turned on by the second scan signal; and an eighth transistor coupled between a first electrode of the light emitting element and the second power line to be turned on by the first scan signal.

The pixel disposed on the i-th pixel row may further include: a fifth transistor coupled between the first power source and the first node to be turned off by the emission control signal supplied to an i-th emission control line; and a sixth transistor coupled between the third node and the first electrode of the light emitting element to be turned off by the emission control signal.

The fourth transistor and the seventh transistor may be configured to be turned on at different time points.

When the first initialization power source is supplied at the high level, the fourth transistor may be turned on. When the first initialization power source is supplied at the low level, the seventh transistor may be turned on.

A gate electrode of the fourth transistor may be coupled to an i−2-th first scan line.

A gate electrode of the seventh transistor may be coupled to an i−3-th second scan line.

When the second initialization power source is supplied at the low level, the eighth transistor may be turned on.

A gate electrode of the eighth transistor may be coupled to an i-th first scan line.

A gate electrode of the eighth transistor may be coupled to an i−2-th first scan line.

The second power line may be coupled to a fourth transistor and a seventh transistor included in a pixel disposed on an i+1-th pixel row among the pixels. The first power line may be coupled to an eighth transistor of the pixel disposed on the i+1-th pixel row. When the second initialization power source is supplied at the high level, the fourth transistor included in the pixel disposed on the i+1-th pixel row may be turned on. When the second initialization power source is supplied at the low level, the seventh transistor included in the pixel disposed on the i+1-th pixel row may be configured to be turned on. When the second initialization power source is supplied at the low level, the eighth transistor included in the pixel disposed on the i+1-th pixel row may be turned on.

Either the first power line or the second power line may be disposed between the i-th pixel row and an i+1-th pixel row.

The first power line may extend in a pixel row direction between the i-th pixel row and the i+1-th pixel row. The second power line may extend in the pixel row direction between the i+1-th pixel row and an i+2-th pixel row.

The first power line may be coupled to the fourth and the seventh transistors of the pixel disposed on the i-th pixel row and an eighth transistor of a pixel disposed on the i+1-th pixel row.

The first power line and the second power line may be disposed alternately in a pixel column direction.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
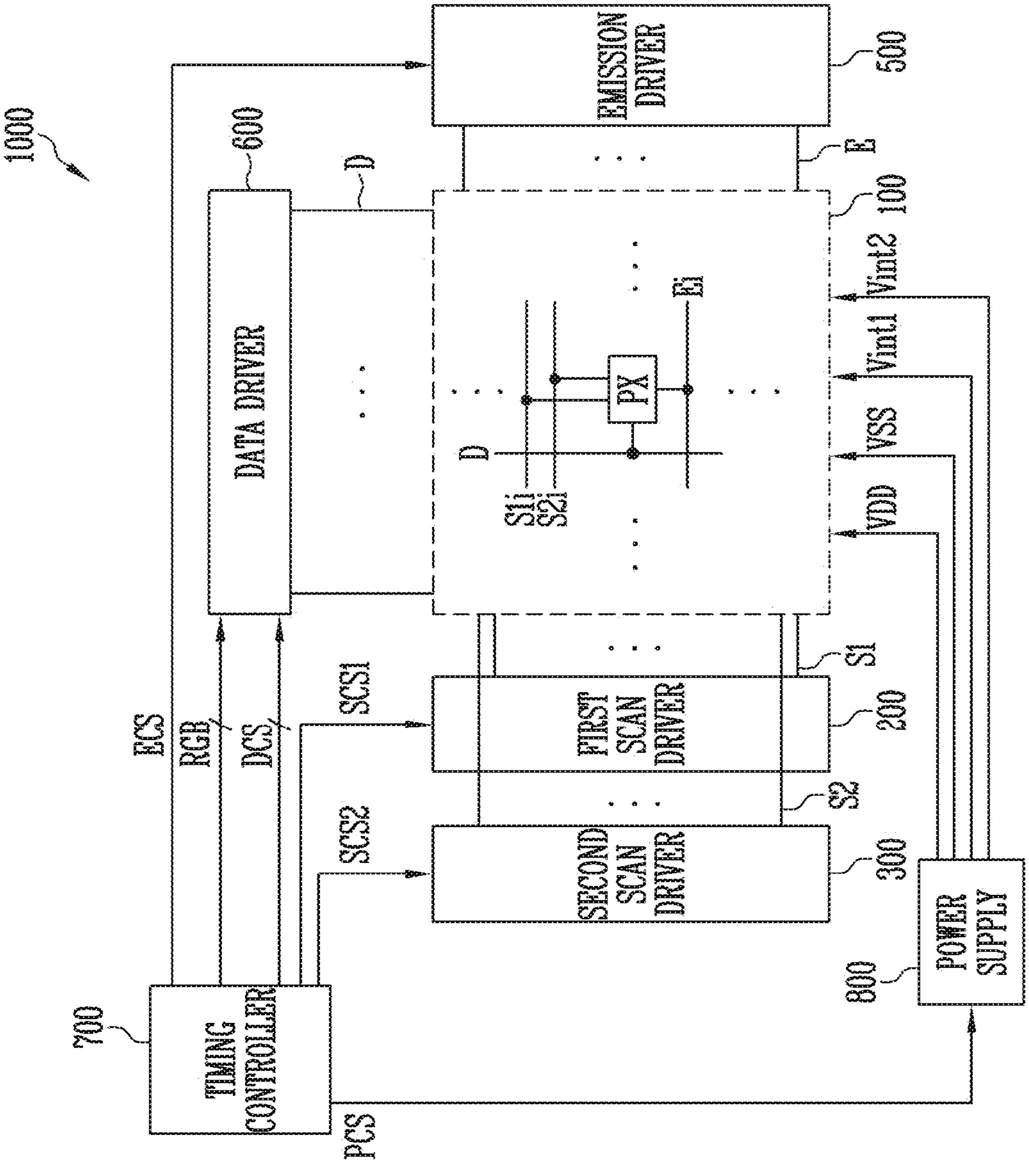
FIG. 1 is a block diagram of an embodiment of a display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the illustrative term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram of an embodiment of a display device 1000 constructed according to the principles of the invention.

Referring to FIG. 1, the display device 1000 may include a pixel part 100, scan drivers 200 and 300, an emission driver 500, a data driver 600, and a timing controller 700. The display device 1000 may include a power supply 800.

The scan drivers 200 and 300 may implemented as a first scan driver 200 and a second scan driver 300. However, the embodiments of the invention are not limited thereto, as the division of the scan drivers 200 and 300 is only for the sake of explanation. For example, depending on the design, at least portions of the scan drivers may be integrated into a single driving circuit, a module, or the like.

The display device 1000 may display images at various driving frequencies (or various image refresh rates) depending on driving conditions. A driving frequency may be a frequency at which data signals are substantially applied to a driving transistor of a pixel PX. For example, the driving frequency may also be referred to as "scan rate" or "refresh frequency" and indicate the number of images displayed per second.

The image refresh rate may be an output frequency of the data driver 600 and/or the second scan driver 300. For example, the refresh rate for driving a video may be a frequency of approximately 60 Hz or more (e.g., 120 Hz).

The display device 1000 may adjust, depending on driving conditions, the output frequency of the second scan driver 300 and an output frequency of the data driver 600 corresponding to the output frequency of the second scan driver 300. For example, the display device 1000 may display images in response to various image refresh rates ranging from 1 Hz to 120 Hz. However, the embodiments of the invention are not limited thereto. For example, the display device 1000 may also display images at an image refresh rate (e.g., 240 Hz, or 480 Hz) greater than 120 Hz.

The pixel part 100 may include pixels PX disposed to be coupled with data lines D, scan lines S1 and S2, and emission control lines E. The pixels PX may be supplied with voltages of a first power source VDD and a second power source VSS from an external device. In an embodiment, each of the pixels PX may be further supplied with a voltage of a first initialization power source Vint1 or a second initialization power source Vint2. In an embodiment, referring to FIG. 4, the pixels PX may be supplied with signals for displaying an image during a first period P1 and retain the image displayed in the first period P1 during a second period P2. For example, the pixels PX may be driven in a first mode during the first period P1 in which an image is displayed at a first frequency (e.g., high-frequency). Further, the pixels PX may be driven in a second mode during the second period P2 in which the image is displayed in a low-frequency driving manner.

The timing controller 700 may generate a first scan driving control signal SCS1, a second scan driving control signal SCS2, an emission driving control signal ECS, and a data driving control signal DCS in response to synchronization signals supplied from an external device. The first scan driving control signal SCS1 may be supplied to the first scan driver 200. The second scan driving control signal SCS2 may be supplied to the second scan driver 300. The emission driving control signal ECS may be supplied to the emission driver 500. The data driving control signal DCS may be supplied to the data driver 600. The timing controller 700 may rearrange image data supplied from an external device and supply the image data to the data driver 600.

The data driving control signal DCS may include a source start pulse and clock signals. The source start pulse may control a time point at which data sampling starts. The clock signals may be used to control a sampling operation.

The timing controller 700 may generate a power source control signal PCS for controlling the operation of the power supply 800. The power source control signal PCS may control a supply timing and/or a voltage level of at least one of the first power source VDD, the second power source VSS, the first initialization power source Vint1, and the second initialization power source Vint2.

The data driver 600 may convert rearranged image data RGB into an analog data signal. The data driver 600 may supply data signals to data lines D in response to the data driving control signal DCS.

The data driver 600 may supply data signals to the data lines D during a frame period in response to an image refresh rate. For example, the data driver 600 may supply data signals to the data lines D at a frequency corresponding to the image refresh rate. Here, the data signals to be supplied to the data lines D may be synchronized with scan signals to be supplied to the first scan lines S1.

The second scan driver 300 may supply scan signals to the second scan lines S2 based on the second scan driving control signal SCS2. For example, the second scan driver 300 may sequentially supply second scan signals to the second scan lines S2 such as S2*i*, S2(*i*–2), and S2(*i*–3) shown in FIGS. 2, 3, and 4. Here, each second scan signal may be set to a gate-on voltage so that a transistor included in the pixel PX may be turned on. For example, the gate-on voltage of the second scan signals may be a logic high level to turn on N-type transistors such as a third transistor M3 and a seven transistor M7 shown in FIG. 2.

Figure 3:
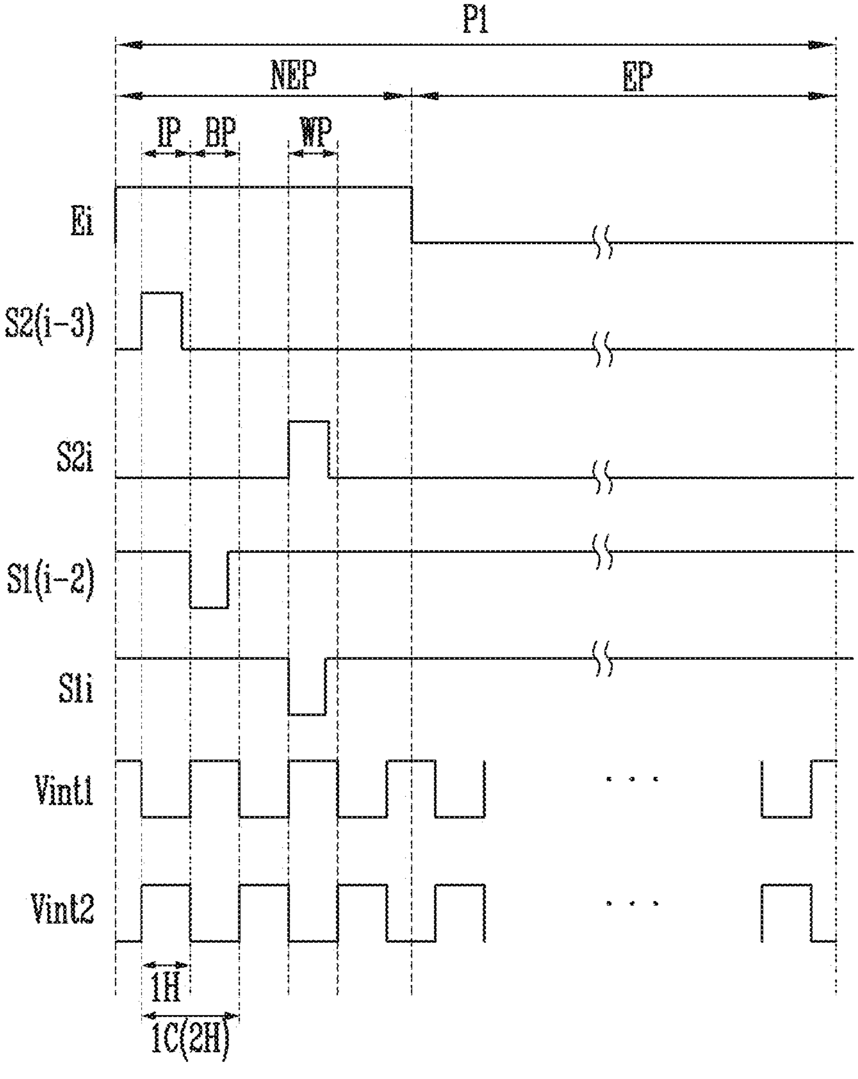
FIG. 3 is a timing diagram illustrating of an embodiment of an operation of the pixels of FIG. 2.
Figure 4:
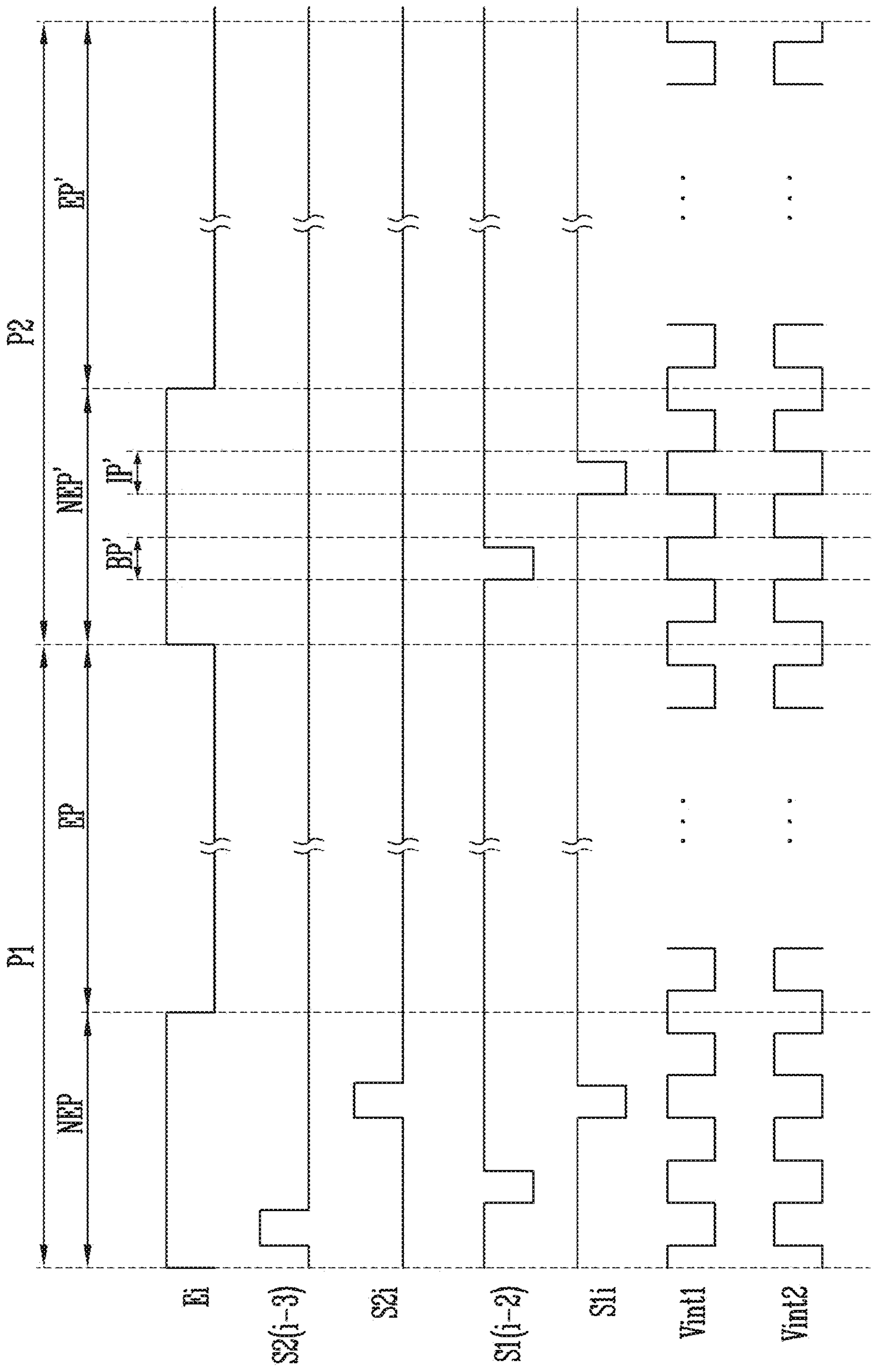
FIG. 4 is a timing diagram illustrating of another embodiment of an operation of the pixels of FIG. 2.

The second scan driver 300 may supply the second scan signals to the second scan lines S2 during the first period P1 as shown in FIGS. 3 and 4. The first period P1 may be repeated at the same frequency (e.g., a first frequency) as that of the image refresh rate. Therefore, the second scan driver 300 may supply the second scan signal at the same frequency as the image refresh rate. For example, in the case where the first frequency is 120 Hz, the first period may be repeated at 120 Hz.

The first period P1 may include an emission period EP and a non-emission period NEP, and be a period in which data signals corresponding to an image are written to the pixels PX.

The first scan driver 200 may supply scan signals to the first scan lines S1 based on the first scan driving control signal SCS1. For example, the first scan driver 200 may successively supply first scan signals to the first scan lines S1 such as S1*i*, S1(*i*–2), and S1(*i*–1) shown in FIGS. 2, 3, and 4. Here, each first scan signal may be set to a gate-on voltage so that a transistor included in the pixel PX may be turned on. For example, the gate-on voltage of the first scan signals may be a logic low level to turn on P-type transistors such as a second transistor M2, a fourth transistor M4, and a eight transistor M8 shown in FIG. 2.

That is, a gate-on voltage of a scan signal to be supplied to a P-type transistor between the first and second scan signals may have a logic low level, and a gate-on voltage of a scan signal to be supplied to an N-type transistor may have a logic high level.

The first scan driver 200 may supply the first scan signals to the first scan lines S1 during the first period P1 and a second period P2 as shown in FIGS. 3 and 4. Therefore, the first scan driver 200 may supply the first scan signals to the first scan lines S1 regardless of the image refresh rate.

The second period P2 may be enabled during a low-frequency driving operation of the display device 100. For example, in the case where the image refresh rate is less than the first frequency, the second period may be enabled at least once immediately after the first period.

For example, referring to FIG. 4, the second period P2 may include an emission period EP' and a non-emission period NEP', which may include a bias period BP' in which a bias is applied to the pixels PX in response to the first scan signals. For example, in response to a first scan signal, a predetermined voltage (e.g., a bias voltage) may be applied to a source electrode and/or a drain electrode of the driving transistor (i.e., M1, M1' of FIG. 2) of the corresponding pixel PX, and the driving transistor may be on-biased. The second period P2 may be a driving period which is applied to a low-frequency driving operation. Since the second period is a period in which an image programmed during the first period is retained, the second period may be defined as a holding sub-frame. In other words, the pixels PX may be driven in the second mode during the second period P2 in which the image is displayed in a low-frequency driving manner.

Depending on the image refresh rate, the number of times the second periods P2 are successively repeated (or a total length of successive second periods) may vary.

The emission driver 500 may receive an emission driving control signal ECS from the timing controller 700, and supply emission control signals to the emission control lines E based on the emission driving control signal ECS. For example, the emission driver 500 may sequentially supply the emission control signals to the emission control lines E.

When the emission control signals are sequentially supplied to the emission control lines E, the pixels PX may be not-emitted on a horizontal line basis. To this end, each emission control signal may be set to a gate-off voltage (e.g., a logic high level) so that some transistors (e.g., P-type transistors) included in the corresponding pixels PX can be turned off.

The emission control signal is used to control the emission time of the pixels PX. In an embodiment, the emission control signal may be set to have a width greater than that of the first or second scan signal.

The emission driver 500 may supply emission control signals to the emission control lines E during the first period P1 and the second period P2. In other words, the emission driver 500 may output the emission control signals at a second frequency regardless of the image refresh rate (e.g., the first frequency).

For example, in the case where the second frequency (i.e., the output frequency of the emission control signal) is 120 Hz and the first frequency (i.e., the image refresh rate) is 60 Hz, one first period and one second period may be alternately repeated. In the case where the second frequency is 120 Hz and the first frequency is 30 Hz, one first period and two successive second periods may be alternately repeated.

In an embodiment, if the first frequency is equal to the second frequency, only the first periods may be repeated.

The power supply 800 may supply at least one of the first power source VDD, the second power source VSS, the first initialization power source Vint1, and the second initialization power source Vint2 to the pixel part 100 based on the power source control signal PCS. The power supply 800 may supply the first initialization power source Vint1 to some of the pixels PX through a first power line and supply the second initialization power source Vint2 to other some of the pixels PX through a second power line.

The first and second initialization power sources Vint1 and Vint2 may alternately output high-level voltages and low-level voltages as shown in FIGS. 3 and 4.

The power supply 800 may generate a high-potential voltage or a low-potential voltage for determining whether the scan signals or the emission control signals each have a logic low level or a logic high level. The high level of each of the first and second initialization power sources Vint1 and Vint2 may be set to a value equal to or different from that of the high-potential voltage. Likewise, the low level of each of the first and second initialization power sources Vint1 and Vint2 may be set to a value equal to or different from that of the low-potential voltage.

With regard to the circuit structure of the pixels PX, pixels PX that are disposed on a current horizontal line (or a current pixel row) may be additionally coupled with a scan line that is disposed on a preceding horizontal line (or a preceding pixel row) and/or a scan line that is disposed on a subsequent horizontal line (or a subsequent pixel row). To this end, the pixel part 100 may include additional dummy scan lines and/or dummy emission control lines, which are not illustrated.

Figure 2:
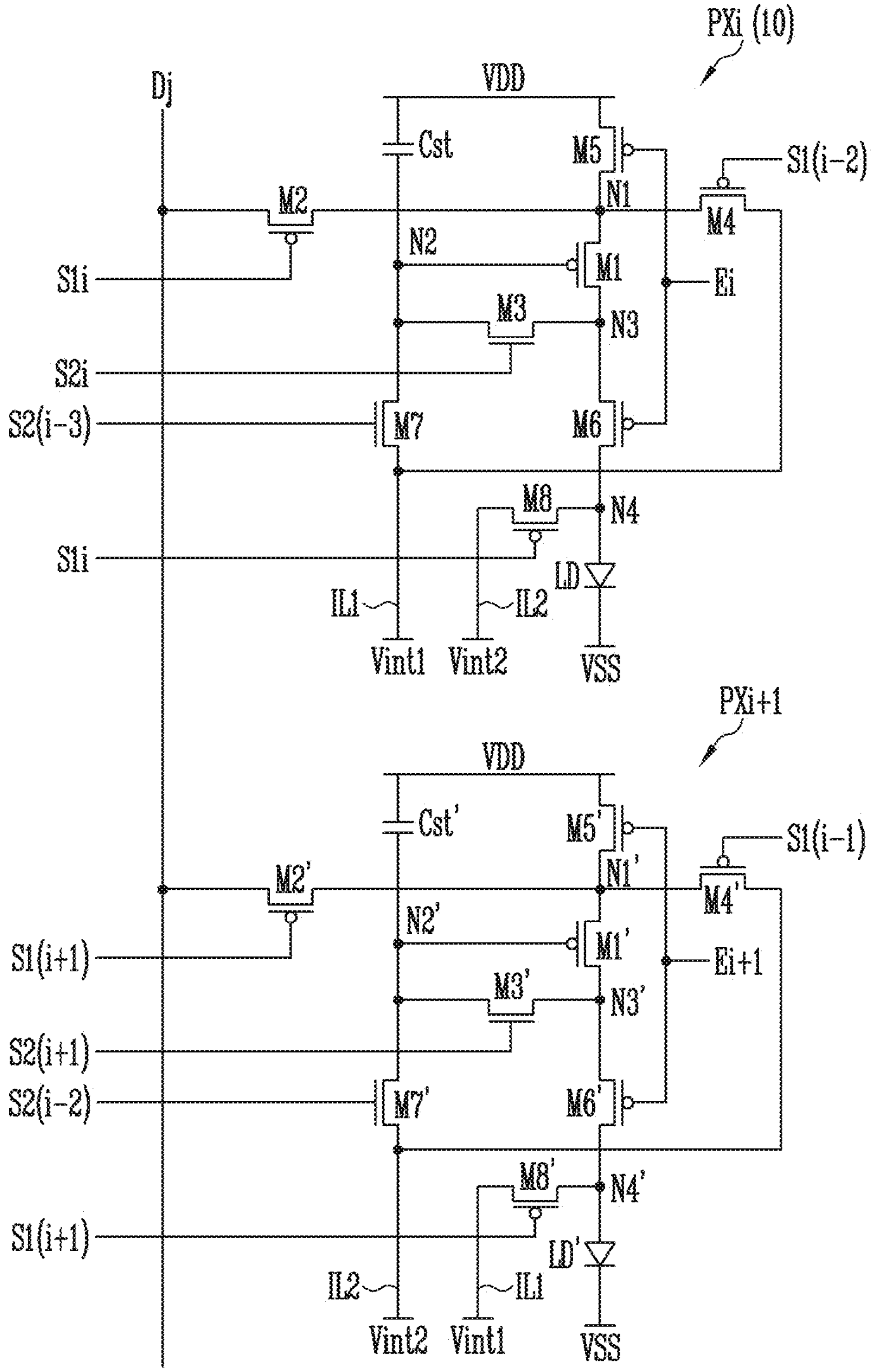
FIG. 2 is a circuit diagram of an embodiment of representative pixels included in the display device of FIG. 1.

FIG. 2 is a circuit diagram of an embodiment of representative pixels included in the display device of FIG. 1.

Referring to FIG. 2, an i-th pixel PXi disposed on an i-th pixel row (an i-th horizontal line) and an i+1-th pixel PXi+1 disposed on an i+1-th pixel row (an i+1-th horizontal line) may have substantially the same pixel structure.

The i-th pixel PXi and the i+1-th pixel PXi+1 may be coupled to a j-th data line Dj. Hereinafter, the pixel structure will be described based on the configuration of the i-th pixel PXi.

A pixel 10 (e.g., the i-th pixel PXi) may include a light emitting element LD, first to eighth transistors M1 to M8, and a storage capacitor Cst.

The light emitting element LD may include a first electrode (either an anode electrode or a cathode electrode) coupled to a fourth node N4, and a second electrode (the other one of the cathode electrode and the anode electrode) coupled to the second power source VSS. The light emitting element LD may emit light having a predetermined luminance corresponding to current supplied from the first transistor M1.

The light emitting element LD may be an organic light emitting diode including an organic light emitting layer. In an embodiment, the light emitting element LD may be an inorganic light emitting element formed of inorganic material. The light emitting element LD may have configuration in which a plurality of inorganic light emitting elements are coupled in parallel and/or series between the second power source VSS and the fourth node N4.

The first transistor (or the driving transistor) M1 may include a first electrode coupled to a first node N1, and a second electrode coupled to a third node N3. The gate electrode of the first transistor M1 is coupled to the second node N2. The first transistor M1 may control, in response to the voltage of the second node N2, the amount of current flowing from the first power source VDD to the second power source VSS via the light emitting element LD. To this end, the first power source VDD may be set to a voltage higher than the second power source VSS.

The second transistor M2 may be coupled between a j-th data line Dj and the first node N1. The gate electrode of the second transistor M2 may be coupled to an i-th first scan line S1*i*. When a first scan signal is supplied to the i-th first scan line S1*i*, the second transistor M2 may be turned on to electrically couple the data line Dj with the first node N1.

The third transistor M3 may be coupled between the second electrode (i.e., the third node N3) of the first transistor M1 and the second node N2. The gate electrode of the third transistor M3 may be coupled to the i-th second scan line S2*i*. When a second scan signal is supplied to the i-th second scan line S2*i*, the third transistor M3 may be turned on to electrically connect the second electrode of the first transistor M1 to the second node N2. Therefore, when the third transistor M3 is turned on, the first transistor M1 may be connected in the form of a diode.

The third transistor M3 may be formed of an oxide semiconductor transistor. For example, the third transistor M3 may be an N-type oxide semiconductor transistor, and include an oxide semiconductor layer as an active layer. Hence, the gate-on voltage for turning on the third transistor M3 may have a logic high level.

An oxide semiconductor transistor may be produced through a low-temperature process, and have low charge mobility compared to that of the poly-silicon semiconductor transistor. In other words, the oxide semiconductor transistor may have excellent off-current characteristics. Therefore, if the third transistor M3 is formed of an oxide semiconductor transistor, leakage current from the second node N2 may be minimized, whereby the display quality of the display device may be enhanced.

However, the embodiments of the invention are not limited thereto. For example, the third transistor M3 may be formed of a P-type poly-silicon semiconductor transistor.

The storage capacitor Cst may be coupled between the first power source VDD and the second node N2. The storage capacitor Cst may store a voltage corresponding to a data signal.

The fourth transistor M4 may be turned on by a first scan signal supplied from an i−2-th first scan line S1(*i*−2) so that a bias voltage can be supplied to the first node (N1, for example, the source electrode of the first transistor M1). In an embodiment, the fourth transistor M4 may be coupled between the first node N1 and the first power line IL1. The voltage of the first initialization power source Vint1 may be supplied to the first power line IL1. The gate electrode of the fourth transistor M4 may be coupled to the i−2-th first scan line S1(*i*−2).

The fifth transistor M5 may be coupled between the first power source VDD and the first node N1. The gate electrode of the fifth transistor M5 may be coupled to an i-th emission control line Ei. The fifth transistor M5 may be turned off when an emission control signal is supplied to the i-th emission control line Ei, and may be turned on in the other cases.

The sixth transistor M6 may be coupled between the second electrode (i.e., the third node N3) of the first transistor M1 and the first electrode (i.e., the fourth node N4) of the light emitting element LD. The gate electrode of the sixth transistor M6 may be coupled to an i-th emission control line Ei. The sixth transistor M6 may be turned off when an emission control signal is supplied to the i-th emission control line Ei, and may be turned on in the other cases.

In an embodiment, each of the fifth and sixth transistors M5 and M6 may be formed of a P-type poly-silicon semiconductor transistor.

The seventh transistor M7 may be coupled between the second node N2 and the first power line IL1. The gate electrode of the seventh transistor M7 may be coupled to the i−3-th second scan line S2(*i*−3). When a second scan signal is supplied to the i−3-th second scan line S2(*i*−3), the seventh transistor M7 may be turned on so that the voltage of the first initialization power source Vint1 may be supplied to the second node N2.

In an embodiment, the seventh transistor M7 may be formed of an oxide semiconductor transistor.

The fourth transistor M4 and the seventh transistor M7 may be turned on during different periods. For example, the seventh transistor M7 and the fourth transistor M4 may be sequentially turned on. In an embodiment, when the fourth transistor M4 is turned on, the first initialization power source Vint1 may have a high level. When the seventh transistor M7 is turned on, the first initialization power source Vint1 may have a low level In an embodiment, the low level of the first initialization power source Vint1 may be set to a value lower than the lowest voltage of a data signal to be supplied to the j-th data line Dj. Therefore, the gate voltage of the first transistor M1 may be initialized to the low level of the first initialization power source Vint1 by turning on the seventh transistor M7, and the voltage to be stored in the storage capacitor Cst may also be initialized. However, the embodiments of the invention are not limited thereto. For example, the low level of each of the first and second initialization power sources Vint1 and Vint2 may be set to a value higher than the voltage of the second power source VSS.

For example, if the low level of each of the first and second initialization power sources Vint1 and Vint2 is excessively low, bias variation (or hysteresis variation) of the first transistor M1 may be increased. Such hysteresis may cause a flicker phenomenon in the low-frequency driving operation. Therefore, the low level of each of the first and second initialization power sources Vint1 and Vint2 may be set to a value higher than a predetermined voltage level depending on operation conditions of the display device. Hence, the flicker phenomenon in the low-frequency driving may be mitigated, and the step efficiency may be improved.

In an embodiment, the high level of the first initialization power source Vint1 may be set to a value similar to the voltage of the first power source VDD. For example, the high level of the first initialization power source Vint1 may range from approximately 5V to approximately 8V. When the fourth transistor M4 is turned on, the high level of the first initialization power source Vint1 may be supplied to the first node N1, and the first transistor M1 may have an on-bias state (i.e., on-biased). Hence, since the high level of the first initialization power source Vint1 has a substantially constant magnitude that is supplied to the first transistor M1, the hysteresis characteristics of the first transistor M1 may be improved, and the bias difference (a hysteresis deviation) between the respective first transistors M1 of the pixels 10 may be reduced.

The eighth transistor M8 may be coupled between the second power line IL2 and the fourth node N4. In an embodiment, the gate electrode of the eighth transistor M8 may be coupled to the i-th first scan line S1*i*. The voltage of the second initialization power source Vint2 may be supplied to the second power line IL2.

When the first scan signal is supplied, the eighth transistor M8 is turned on so that the voltage of the second initialization power source Vint2 may be supplied to the first electrode (e.g., the fourth node N4) of the light emitting element LD. In an embodiment, when the eighth transistor M8 is turned on, the low level of the second initialization power source Vint2 may be supplied to the first electrode of the light emitting element LD through the second power line IL2.

When the low level of the second initialization power source Vint2 is supplied to the first electrode of the light emitting element LD, the parasitic capacitor of the light emitting element LD may be discharged. As residual voltage charged into the parasitic capacitor is discharged (removed), undesired fine emission may be prevented. Therefore, the black expression performance of the pixel 10 may be enhanced.

In an embodiment, each of the transistors M1, M2, M4, M5, M6, and M8 other than the third transistor M3 and the seventh transistor M7 may be formed of a poly-silicon transistor and include a poly-silicon semiconductor layer as an active layer (channel). For example, the active layer may be formed through a low-temperature poly-silicon process. For example, the poly-silicon transistor may be a P-type poly-silicon transistor.

Since the poly-silicon semiconductor transistor has an advantage of a high response speed, the poly-silicon semiconductor transistor may be applied in a switching element in which a high-speed switching operation is required.

However, the embodiments of the invention are not limited thereto. For example, at least some of the first to eighth transistors M1 to M8 each may be formed of an oxide semiconductor transistor, and the other transistors each may be formed of a poly-silicon transistor.

In an embodiment, the i+1-th pixel PXi+1 may include a light emitting element LD', first to eighth transistors M1' to M8', and a storage capacitor Cst. Gate electrodes of the first to eighth transistors M1' to M8' of the i+1-th pixel PXi+1 may be coupled with scan lines and emission control lines that are subsequent to the scan lines and the emission control lines that are coupled to the i-th pixel PXi. The operation of the i+1-th pixel PXi+1 may be similar to that of the i-th pixel PXi.

In an embodiment, the fourth transistor M4' of the i+1-th pixel PXi+1 may be coupled between the first node N1' and the second power line IL2. When a first scan signal is supplied to the i−1-th first scan line S1(*i*−1), the fourth transistor M4' may be turned on so that the high level of the second initialization power source Vint2 may be supplied to the first node N1'. In other words, when the fourth transistor M4' of the i+1-th pixel PXi+1 is turned on, the second initialization power source Vint2 may be supplied to the first node N1' at the high level. Therefore, the high level of the second initialization power source Vint2 may be supplied to the first node N1' of the i+1-th pixel PXi+1, and the first transistor M1' of the i+1-th pixel PXi+1 may be on-biased.

In an embodiment, the seventh transistor M7' of the i+1-th pixel PXi+1 may be coupled between the second node N2' and the second power line IL2. When a second scan signal is supplied to the i−2-th second scan line S2(*i*−2), the seventh transistor M7' may be turned on so that the low level of the second initialization power source Vint2 may be supplied to the second node N2'. In other words, when the seventh transistor M7' of the i+1-th pixel PXi+1 is turned on, the second initialization power source Vint2 may be supplied to the second node N2' at the low level. Therefore, the gate voltage of the first transistor M1' of the i+1-th pixel PXi+1 may be initialized.

In an embodiment, the eighth transistor M8' of the i+1-th pixel PXi+1 may be coupled between the fourth node N4' and the first power line IL1. When a first scan signal is supplied to the i+1-th first scan line S1(*i*+1), the eighth transistor M8' may be turned on so that the low level of the first initialization power source Vint1 may be supplied to the fourth node N4'. In other words, when the eighth transistor M8' of the i+1-th pixel PXi+1 is turned on, the first initialization power source Vint1 may be supplied to the second node N2' at the low level. Therefore, the anode voltage of the light emitting element LD' of the i+1-th pixel PXi+1 may be initialized.

As described above, referring to FIG. 2, the first power line IL1 may be coupled to the fourth transistor M4 and the seventh transistor M7 of the i-th pixel PXi and the eighth transistor M8' of the i+1-th pixel PXi+1. The second power line IL2 may be coupled to the eight transistor M8 of the i-th pixel PXi and the fourth transistor M4' and the seventh transistor M7' of the i+1-th pixel PXi+1. Furthermore, the first initialization power source Vint1 and the second initialization power source Vint2 may be alternately have the high level (or the low level). Hence, on-biases may be periodically applied to the first transistor M1 by swing of the first and second initialization power sources Vint1 and Vint2, and the gate voltage of the first transistor M1 may be periodically initialized. Consequently, the flicker phenomenon in the low-frequency driving operation may be mitigated, and the step efficiency in the high-frequency driving operation may be improved.

Furthermore, the initialization and the on-bias operation may be performed by periodically changing the voltages of the first and second initialization power sources Vint1 and Vint2 without using an additional line or an additional power supply for application of a bias voltage. Therefore, the production cost may be reduced, and unnecessary complexity in the display panel may be avoided. Therefore, the image quality of the display device 1000 may be improved.

FIG. 3 is a timing diagram of an embodiment of an operation of the pixels of FIG. 2.

Referring to FIGS. 1 to 3, the pixel 10 may be supplied with signals for displaying an image during a first period P1. The first period P1 may include a period for which a data signal DS substantially corresponding to an output image is input.

Operations of the pixel 10 (e.g., PXi and PXi+1 of FIG. 2) and the display device 1000 may be divided into an operation in an emission period EP and an operation in a non-emission period NEP.

FIG. 3 illustrates an operation of the pixel 10 during the first period P1. For example, the display device 1000 may be driven in a first mode in which an image is displayed at a first frequency.

In the case where the display device 1000 is driven in the first mode, the pixel 10 may be supplied with a first scan signal and a second scan signal at the first frequency. An emission control signal may also be supplied at the first frequency.

A period in which an emission control signal is supplied to the i-th emission control line Ei (i.e., a period in which an emission control signal having a logic high level is supplied) may correspond to the non-emission period NEP of the pixel 10. A period in which an emission control signal is not supplied to the i-th emission control line Ei (i.e., a period in which an emission control signal having a logic low level is supplied) may correspond to the emission period EP of the pixel 10.

During the non-emission period NEP, the fifth and sixth transistors M5 and M6 are turned off by an emission control signal so that the pixel 10 does not emit light.

The non-emission period NEP may include an initialization period IP, a bias period BP, and a write period WP. Here, the first scan signal may be supplied during the bias period BP and the write period WP. The second scan signal may be supplied during the initialization period IP and the write period WP.

The initialization period IP, the bias period BP, and the write period WP each may correspond to approximately one horizontal cycle 1H. Furthermore, pulse widths of the first scan signal and the second scan signal each may correspond to approximately one horizontal cycle 1H.

The power supply 800 may output the first initialization power source Vint1 alternately at the high level and the low level for each first cycle 1C. For example, the first cycle 1C may correspond to approximately two horizontal cycles 2H. Therefore, when the second scan signal is supplied to an i-3-th second scan line S2(*i*−3), the first initialization power source Vint1 may be output at the low level as shown in FIG. 3. When the first scan signal is supplied to an i-2-th first scan line S1(*i*−2) (and an i-2-th second scan line), the first initialization power source Vint1 may be output at the high level as shown in FIG. 3.

Likewise, the power supply 800 may output the second initialization power source Vint2 alternately at the high level and the low level for each first cycle. The power supply 800 may output the high level of the second initialization power source Vint2 overlapping with the low level of the first initialization power source Vint1, and output the low level of the second initialization power source Vint2 overlapping with the high level of the first initialization power source Vint1. Therefore, the operations of the i-th pixel PXi and the i+1-th pixel PXi+1 each may have the initialization period IP, the bias period BP, and the write period WP with a difference of one horizontal period therebetween.

After the emission control signal has been supplied to the i-th emission control line Ei, the second scan signal may be supplied to the i-3-th second scan line S2(*i*−3) during the initialization period IP. The second scan signal may be a signal for controlling N-type transistors and have a logic high level.

The seventh transistor M7 may be turned on in response to the second scan signal during the initialization period IP. When the seventh transistor M7 is turned on, the low level of the first initialization power source Vint1 may be supplied to the second node N2. Hence, the gate voltage (e.g., a voltage to be charged to the storage capacitor Cst) of the first transistor M1 may be initialized.

The first scan signal may be supplied to the i-2-th first scan line S1(*i*−2) during the bias period BP. The first scan signal may be a signal for controlling P-type transistors and have a logic low level.

The fourth transistor M4 may be turned on in response to the first scan signal during the bias period BP. When the fourth transistor M4 is turned on, the high level of the first initialization power source Vint1 may be supplied to the first node N1, and the first transistor M1 may have an on-biased. In an embodiment, the high level of the first initialization power source Vint1 may range from approximately 5V to approximately 8V. Depending on driving conditions of the display device 1000, the high levels of the first and second initialization power sources Vint1 and Vint2 may be easily adjusted. Since a voltage having a constant level is supplied to the first node N1, a bias difference between the respective first transistors M1 of the pixels PX may be reduced.

Thereafter, the first scan signal may be supplied to the i-th first scan line S1*i* during the write period WP, and the second scan signal may be supplied to the i-th second scan line S2*i*.

When the first scan signal is supplied to the i-th first scan line S1*i*, the second transistor M2 may be turned on. When the second transistor M2 is turned on, a data signal may be supplied to the first node N1.

When the second scan signal is supplied to the i-th second scan line S2*i*, the third transistor M3 may be turned on. When the third transistor M3 is turned on, the first transistor M1 may be connected in the form of a diode, and the threshold voltage of the first transistor M1 may be compensated for. The storage capacitor Cst may store a voltage corresponding to the data signal.

When the first scan signal is supplied to the i-th first scan line S1*i*, the eighth transistor M8 may be turned on. When the eighth transistor M8 is turned on, the low level of the second initialization power source Vint2 is supplied to the fourth node N4. Therefore, the low level of the second initialization power source Vint2 is supplied to the first electrode of the light emitting element LD, and the parasitic capacitor of the light emitting element LD may be discharged.

However, the embodiments of the invention are not limited thereto. For example, the gate electrode of the eighth transistor M8 may be coupled to the i−2-th first scan line S1(*i*−2). In this case, the fourth transistor M4 and the eighth transistor M8 may be simultaneously turned on.

Thereafter, the supply of the emission control signal to the i-th emission control line Ei may be suspended. When the supply of the emission control signal to the i-th emission control line Ei is suspended, the fifth and the sixth transistors M5 and M6 may be turned on. Here, the first transistor M1 may control driving current flowing to the light emitting element LD in response to the voltage of the second node N2. During the emission period EP, the light emitting element LD may generate light having luminance corresponding to the driving current.

As described above, the display device 1000 may alternately supply, to the pixels PX, the first initialization power source Vint1 and the second initialization power source Vint2, which have a high level (or a low level). Therefore, an initialization operation or an on-bias operation may be performed without using an additional line or an additional power supply for application of a bias voltage or the like. Consequently, the production cost may be reduced, and unnecessary complexity in the display panel may be avoided. As a result, the image quality of the display device 1000 may be improved.

FIG. 4 is a timing diagram of another embodiment of an operation of the pixels of FIG. 2.

Referring to FIGS. 1 to 4, the pixel 10 may be supplied with signals for displaying an image during a first period P1 and retain the image displayed in the first period P1 during a second period P2.

FIG. 4 illustrates an example of a low-frequency driving operation of the display device 1000. For example, the display device 1000 may be driven in a second mode in which an image is displayed in a low-frequency driving manner.

The pixel 10 may be supplied with the second scan signal at a frequency corresponding to the image refresh rate. The first scan signal and the emission control signal may be supplied to the pixel 10 at the same timing as the supply timing (e.g., the frequency) of the scan signal and the emission control signal of FIG. 3 regardless of the image refresh rate.

The operation of the first period P1 may be substantially the same as the operation of the pixel 10 of FIG. 3.

During the second period P2, the same emission control signal as that of the first period P1 may be supplied. In other words, the second period P2 may include an emission period EP' and a non-emission period NEP'. During the second period P2 that is a holding sub-frame, the second scan signal is not supplied.

In an embodiment, a data signal corresponding to an image to be displayed may not be supplied during the second period P2. For example, during the second period P2, a data signal having a predetermined constant voltage level may be supplied, or the data signal may have a state suitable for minimizing power consumption.

The non-emission period NEP' of the second period P2 may include a bias period BP' and an initialization period IP'. The first scan signal may be supplied to the i−2-th first scan line S1(*i*−2) during the bias period BP'.

When the first scan signal is supplied to the i−2-th first scan line S1(*i*−2), the fourth transistor M4 may be turned on.

When the fourth transistor M4 is turned on, the high level of the first initialization power source Vint1 is supplied to the first node N1. Therefore, the first transistor M1 may be on-biased.

In an embodiment, the degree to which the first transistor M1 is on-biased may be controlled by adjusting the size of the low level of the first initialization power source Vint1. For example, if the low level of the first initialization power source Vint1 is increased, the on-bias to be applied to the first transistor M1 may be reduced. Thereby, the bias degree of the first transistor M1 in the emission period EP or EP' may become similar to the bias degree of the first transistor M1 in the other periods. Consequently, the step efficiency may be improved.

The first scan signal may be supplied to the i-th first scan line S1*i* during the initialization period IP'.

When the first scan signal is supplied to the i-th first scan line S1*i*, the second and eighth transistors M2 and M8 may be turned on.

When the second transistor M2 is turned on, a predetermined voltage (e.g., a bias voltage) to be supplied from the j-th data line Dj may be supplied to the first node N1. The bias voltage may be a comparatively high voltage for on-bias. The on-bias may be applied to the first transistor M1 by the driving operation in the initialization period IP'. Therefore, hysteresis characteristics may be improved.

When the eighth transistor M8 is turned on, the low level of the second initialization power source Vint2 is supplied to the fourth node N4. Therefore, the low level of the second initialization power source Vint2 is supplied to the first electrode of the light emitting element LD, and a parasitic capacitor of the light emitting element LD may be discharged.

As such, since the on-bias is applied to the first transistor M1 during the second period P2 for retaining an image, an image flicker phenomenon and an afterimage phenomenon due to the hysteresis characteristics of the first transistor M1 during a low-frequency driving operation may be mitigated. Furthermore, since the voltage of the first electrode of the light emitting element LD1 is initialized during the second period P2, the image quality in the low-frequency driving operation may be improved.

The number of times the second periods P2 are successively repeated may be changed depending on the image refresh rate.

Figure 5:
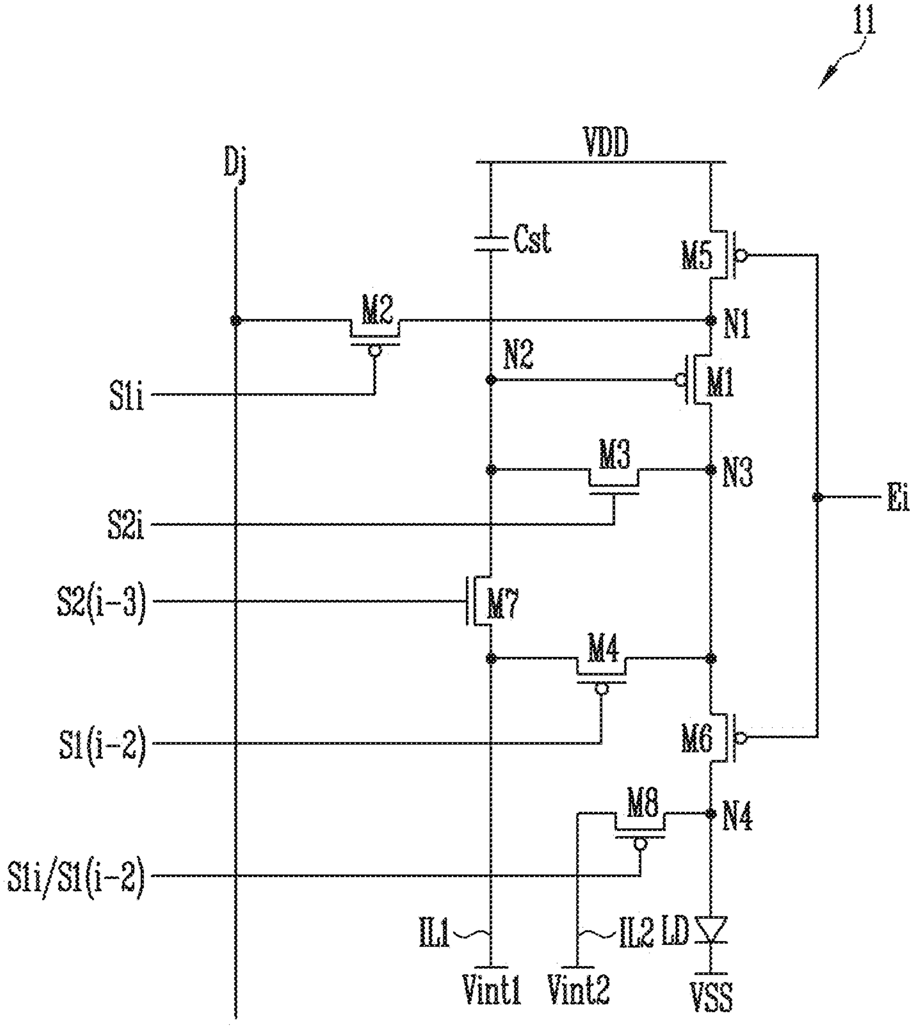
FIG. 5 is a circuit diagram of another embodiment of a representative pixel included in the display device of FIG. 1.

FIG. 5 is a circuit diagram of another embodiment of a representative pixel included in the display device of FIG. 1.

In FIG. 5, like reference numerals will be used to designate the same elements as those described with reference to FIG. 2, and repetitive explanation of the elements will be omitted to avoid redundancy. The pixel of FIG. 5 other than a fourth transistor may be substantially the same as or similar to the pixel of FIG. 2. Specifically, the fourth transistor M4 of FIG. 5 has a different connection than the fourth transistor M4 of FIG. 2.

Referring to FIGS. 1 and 5, a pixel 11 may include a light emitting element LD, first to eighth transistors M1 to M8, and a storage capacitor Cst.

The pixel 11 may be a pixel disposed on an i-th pixel row (an i-th horizontal line).

The fourth transistor M4 may be coupled between the third node N3 and the first power line IL1. The fourth transistor M4 may be turned on in response to a first scan signal supplied to the i−2-th first scan line S1(*i*−2) so that the high level of the first initialization power source Vint1 may be supplied to a third node (N3, e.g., a drain electrode of the first transistor M1). Therefore, the first transistor M1 may be on-biased, hysteresis characteristics of the first transistor M1 may be improved, and the hysteresis deviation with first transistors of other pixels may be reduced.

When the first scan signal is supplied to the i−2-th first scan line S1(*i*−2) or the i-th first scan line S1*i*, the second initialization power source Vint2 may have a low level. Hence, the gate electrode of the eighth transistor M8 may be coupled to the i−2-th first scan line S1(*i*−2) or the i-th first scan line S1*i*.

In the case where the pixel 11 is disposed on the i−1-th pixel row or the i+1-th pixel row, one electrode of each of the fourth, seventh, and eighth transistors M4, M7, and M8 may be coupled to an initialization power source different from an initialization power source to which a pixel disposed on the i-th pixel row is coupled. For example, one electrode of each of the fourth and seventh transistors M4 and M7 of the pixel 11 disposed on the i+1-th pixel row may be coupled to the second power line IL2 for supply of the second initialization power source Vint2, rather than to the first power line IL1. In addition, one electrode of the eight transistor M8 of the pixel 11 disposed on the i+1-th pixel row may be coupled to the first power line IL1 for supply of the first initialization power source Vint1, rather than to the second power line IL2.

All of the pixel rows may be operated, in a manner similar to the driving manner described with reference to FIG. 3 or 4, by the first and second initialization power sources Vint1 and Vint2 that alternately supply a high level and a low level.

Figure 6:
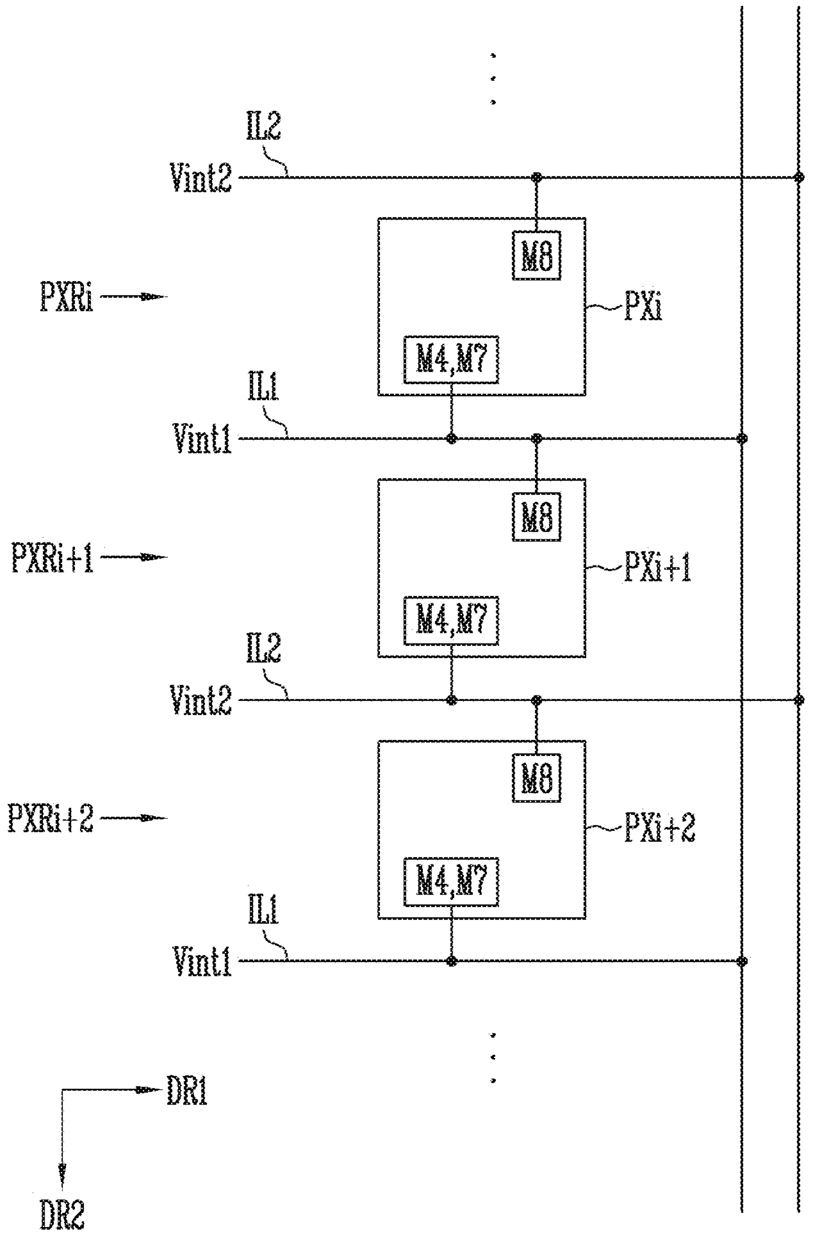
FIG. 6 is a diagram of an embodiment of the connection of a first power line and a second power line to pixels included in the display device of FIG. 1.

FIG. 6 is a diagram of an embodiment of the connection of a first power line and a second power line to pixels included in the display device of FIG. 1.

Referring to FIGS. 1, 2, and 6, the first power line IL1 and the second power line IL2 each may extend between predetermined pixel rows PXRi, PXRi+1, and PXRi+2 and be coupled to pixels PXi, PXi+1, and PXi+2.

The i-th pixel PXi may be disposed on the i-th pixel row PXRi. The i-th pixel row PXRi may be defined as being an imaginary row extending in a first direction DR1. Likewise, the i+1-th pixel PXi+1 may be disposed on the i+1-th pixel row PXRi+1, and the i+2-th pixel PXi+2 may be disposed on the i+2-th pixel row PXRi+2.

The first power line IL1 may transmit the voltage of the first initialization power source Vint1. The second power line IL2 may transmit the voltage of the second initialization power source Vint2.

In an embodiment, either of the first power line IL1 or the second power line IL2 may be disposed between the i-th pixel row PXRi and the i+1-th pixel row PXRi+1. For example, as illustrated in FIG. 6, the first power line IL1 may extend in the first direction DR1 between the i-th pixel row PXRi and the i+1-th pixel row PXRi+1. In this case, the second power line IL2 may extend in the first direction DR1 between the i+1-th pixel row PXRi+1 and the i+2-th pixel row PXRi+2. Furthermore, the second power line IL2 may also extend in the first direction DR1 between an i−1-th pixel row and the i-th pixel row PXRi.

As such, in an embodiment, the first power line IL1 and the second power line IL2 may be alternately disposed in a second direction DR2 corresponding to a pixel column direction. Therefore, the number of lines or conductive patterns for transfer of the first and second initialization power sources Vint1 and Vint2 may not be increased.

In an embodiment, the first power line IL1 that is disposed between the i-th pixel row PXRi and the i+1-th pixel row PXRi+1 may be coupled to the fourth and seventh transistors M4 and M7 of the pixel PXi disposed on the i-th pixel row PXRi and the eighth transistor M8 of the pixel PXi+1 disposed on the i+1-th pixel row PXRi+1. Likewise, the second power line IL2 disposed between the i+1-th pixel row PXRi+1 and the i+2-th pixel row PXRi+2 may be coupled to the fourth and seventh transistors M4 and M7 of the pixel PXi+1 disposed on the i+1-th pixel row PXRi+1 and the eighth transistor M8 of the pixel PXi+2 disposed on the i+2-th pixel row PXRi+2.

As such, the first and second power lines IL1 and IL2 that alternately supply the high level and the low level at different times may be alternately disposed for each pixel row. Therefore, the line structure for supply of the first and second initialization power sources Vint1 and Vint2 may be simplified. In addition, the first and second initialization power sources Vint1 and Vint2 have only different supply timings, so that an additional driver for supply of power is not needed. Therefore, the production cost of the display device 1000 may be reduced.

FIGS. 7 to 10 are circuit diagrams of still other embodiments of representative pixels included in the display device of FIG. 1.

In FIGS. 7 to 10, like reference numerals will be used to designate the same elements as those described with reference to FIG. 2, and repetitive explanation of the elements will be omitted. Pixels of FIGS. 7 to 10, other than the structures of fourth and seventh transistors, may be the same as or substantially similar to the pixel of FIG. 2 or 5. Specifically, the fourth transistor M4 and the seventh transistor M7 of FIGS. 7 to 10 have different connections from the fourth transistor M4 and the seventh transistor M7 of FIG. 2 or FIG. 5.

Referring to FIGS. 1, and 7 to 10, each of the pixels 20, 21, 22, and 23 may include a light emitting element LD, first to eighth transistors M1 to M8, and a storage capacitor Cst.

In an embodiment, the first initialization power source Vint1 and the second initialization power source Vint2 may be supplied to the pixel 20, 21, 22, 23 at a constant voltage level. For example, the first initialization power source Vint1 may have a voltage level for initializing the gate voltage of the first transistor M1. The second initialization power source Vint2 may have a voltage level for initializing the voltage of a first electrode of the light emitting element LD.

In an embodiment, each of the third, fourth, and seventh transistors M3, M4, and M7 is formed of an oxide semiconductor transistor. For example, each of the third, fourth, and seventh transistors M3, M4, and M7 may be an N-type oxide semiconductor transistor, and include an oxide semiconductor layer as an active layer. Hence, the gate-on voltage for turning on the third, fourth, or seventh transistor M3, M4, or M7 may have a logic high level.

Figure 7:
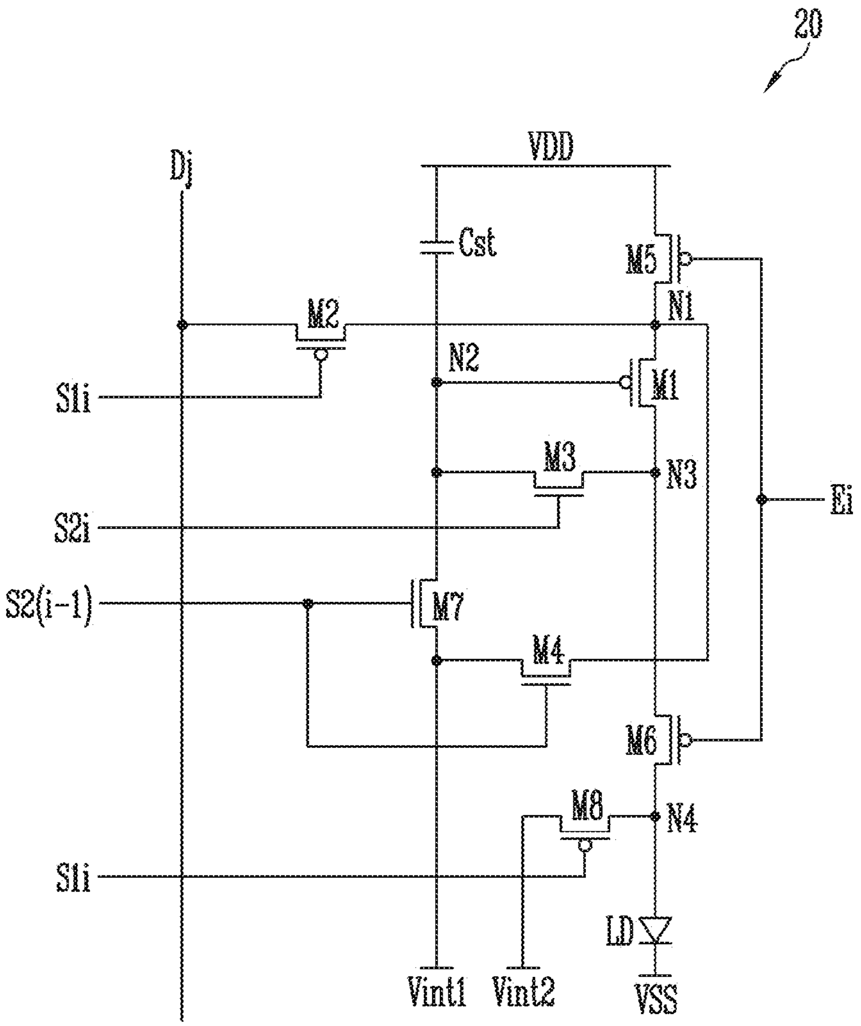
FIGS. 7 to 10 are circuit diagrams of still other embodiments of representative pixels included in the display device of FIG. 1.
Figure 9:
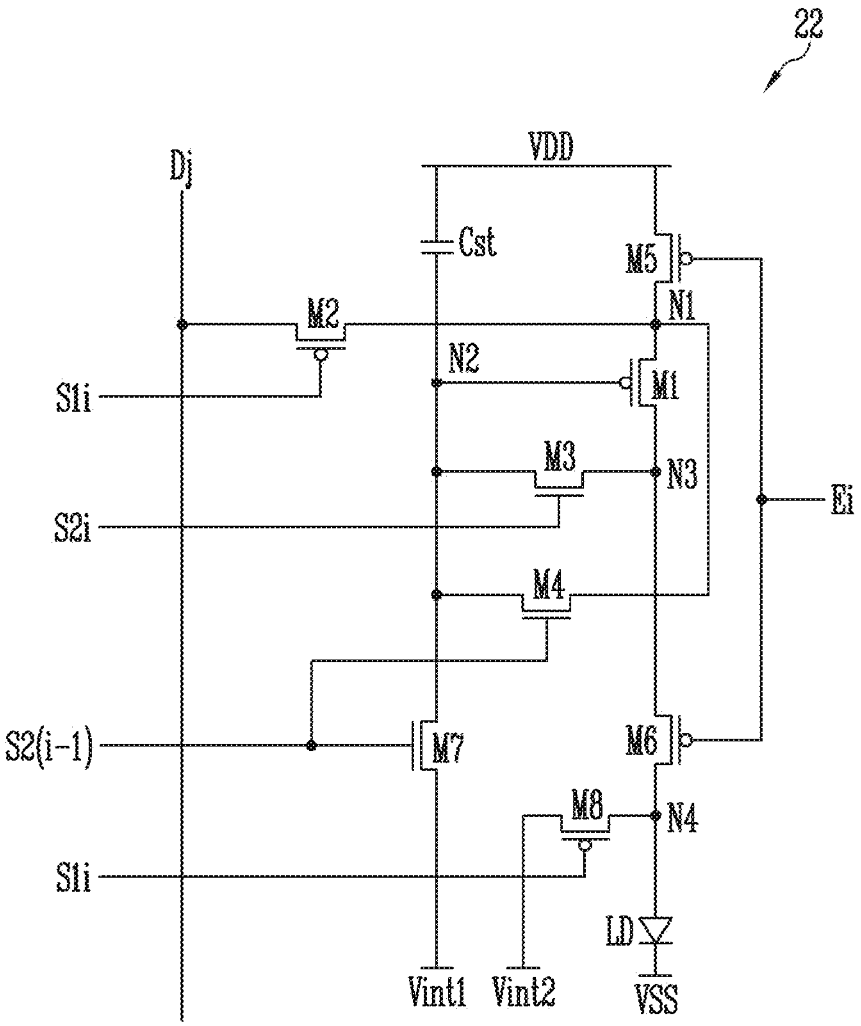

In an embodiment, as illustrated in FIGS. 7 and 9, the fourth transistor M4 may be coupled between the first initialization power source Vint1 and the first node N1. The seventh transistor M7 may be coupled between the second node N2 and the first initialization power source Vint1. Gate electrodes of the fourth and seventh transistors M4 and M7 may be coupled in common to the i−1-th second scan line S2(*i*−1). However, one electrode of the fourth transistor M4 illustrated in FIG. 9 may be electrically coupled to the first initialization power source Vint1 through the seventh transistor M7. In other words, referring to FIG. 7, the first electrode (e.g., source electrode) of the fourth transistor M4 is connected to the second electrode (e.g., drain electrode) of the seventh transistor M7. However, referring to FIG. 9, the first electrode (e.g., source electrode) of the fourth transistor M4 is connected to the first electrode (e.g., source electrode) of the seventh transistor M7.

The fourth and seventh transistors M4 and M7 may be simultaneously turned on by a second scan signal. Therefore, the same voltage may be supplied to the gate electrode (or the second node N2) and the source electrode (or the first node N1) of the first transistor M1. Then, the gate electrode and the source electrode (e.g., Vgs) of the first transistor M1 may become 0 V, so that the first transistor M1 may have an off-bias state.

As such, the bias level of the first transistor M1 in a period in which the second transistor M2 is turned on for writing of data and the bias level of the first transistor M1 in a period in which the fourth and seventh transistors M4 and M7 are turned on may be controlled to be similar to each other. Thereby, the hysteresis characteristics of the first transistor M1 of the pixel 20, 22 may be improved. Therefore, flicker phenomenon in the low-frequency driving operation may be mitigated.

Figure 8:
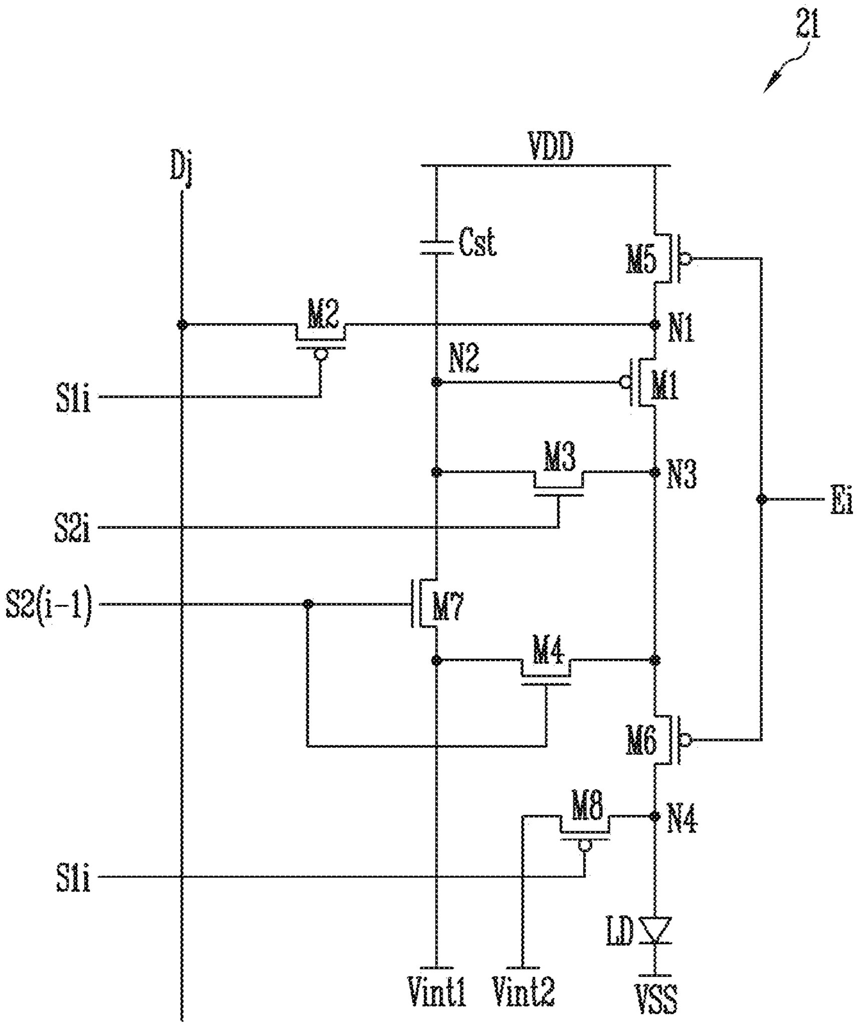
Figure 10:
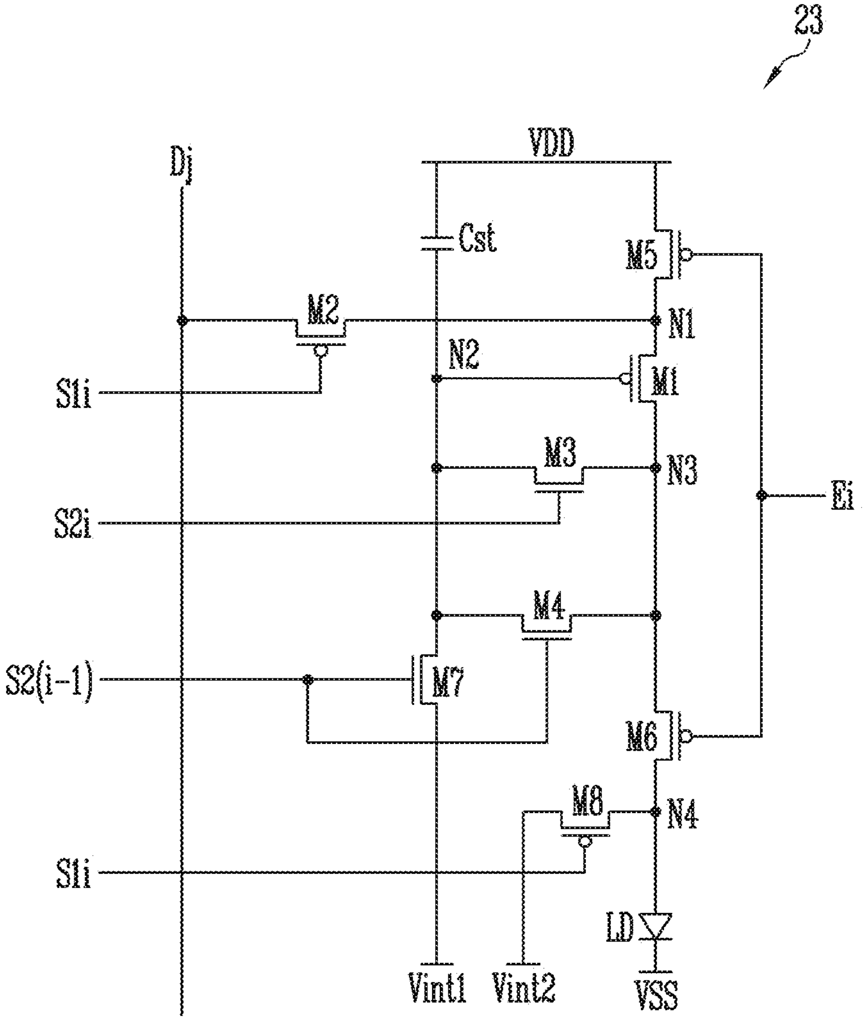

In an embodiment, as illustrated in FIGS. 8 and 10, the fourth transistor M4 may be coupled between the first initialization power source Vint1 and the third node N3. The seventh transistor M7 may be coupled between the second node N2 and the first initialization power source Vint1. Gate electrodes of the fourth and seventh transistors M4 and M7 may be coupled in common to the i−1-th second scan line S2($i$−1). However, one electrode of the fourth transistor M4 illustrated in FIG. 10 may be electrically coupled to the first initialization power source Vint1 through the seventh transistor M7. In other words, referring to FIG. 8, the first electrode (e.g., source electrode) of the fourth transistor M4 is connected to the second electrode (e.g., drain electrode) of the seventh transistor M7. However, referring to FIG. 10, the first electrode (e.g., source electrode) of the fourth transistor M4 is connected to the first electrode (e.g., source electrode) of the seventh transistor M7.

When the fourth and seventh transistors M4 and M7 are simultaneously turned on, the voltage of the first initialization power source Vint1 may be supplied to the second and third nodes N2 and N3. Here, the drain voltage of the first transistor M1 may be similar to the voltage of the first initialization power source Vint1, and the source voltage of the first transistor M1 may have a level corresponding to the difference between the voltage of the first initialization power source Vint1 and the threshold voltage thereof. Therefore, the first transistor M1 of the pixel 21, 23 may have an off-bias state.

As such, in the pixels 20, 21, 22, and 23 according to FIGS. 7 to 10, since an off-bias is applied to the first transistor M1 during the gate voltage initialization operation of the first transistor M1, similar stresses may be applied to the first transistor M1 during the initialization period and the write period. Thus, the hysteresis characteristics of the first transistor M1 may be improved. Consequently, the flicker phenomenon in the low-frequency driving operation may be mitigated, and the step efficiency in the high-frequency driving operation may be improved.

As described above, the first transistor M1 may be controlled to periodically have an on-bias state or an off-bias state. Therefore, the hysteresis change or deviation of the first transistor M1 may be mitigated or reduced. Consequently, a flicker phenomenon due to hysteresis characteristics in the low-frequency driving operation may be mitigated, and the step efficiency in the high-frequency driving operation may be improved. As a result, the image quality may be enhanced.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device to operate in a unit of a first period when displaying first images at a first frequency and operate in a unit of the first period and at least one second period when displaying second images at a second frequency lower than the first frequency, the display device comprising:
- pixels;
- a scan driver to supply a first scan signal, a second scan signal, and a third scan signal;
- an emission driver to supply an emission control signal;
- a power supply to supply a first initialization voltage to a first initialization power line,
- wherein at least one of the pixels comprises:
  - a first transistor connected between a first node and a second node and having a gate electrode connected to a third node;
  - a second transistor connected between a data line and the first node and having a gate electrode to receive the first scan signal;
  - a third transistor connected between the second node and the third node and having a gate electrode to receive the second scan signal;
  - a fourth transistor connected between the first node and the first initialization power line or between the second node and the first initialization power line, and having a gate electrode to receive the third scan signal; and
  - a fifth transistor connected between a first power source and the first node and having a gate electrode to receive the emission control signal;
  - a sixth transistor connected between the second node and a fourth node, and having a gate electrode to receive the emission control signal; and
  - a light emitting element having a first electrode connected to the fourth node and a second electrode connected to a second power source,
- wherein the first to third scan signals are toggled in the first period when the first images are displayed at the first frequency, and
- wherein the first to third scan signals are toggled in the first period and the third scan signal is toggled in the second period when the second images are displayed at the second frequency.

2. The display device of claim 1, wherein the second scan signal is not toggled in the second period at the second frequency.

3. The display device of claim 1, wherein the first scan signal is toggled in the second period at the second frequency.

4. The display device of claim 1, wherein the emission control signal is toggled in the first period at the first frequency, and the emission control signal is toggle in each of the first and second periods at the second frequency.

5. The display device of claim 4, wherein each of the first period and the second period comprises a non-emission period and an emission period, and
- wherein the emission control signal has a gate-off voltage in the non-emission period, and has a gate-on voltage in the emission period.

6. The display device of claim 4, wherein:
- the first to third scan signals are toggled when the emission control signal has a gate-off voltage in the first period at the first frequency; and the first to third scan signals are toggled when the emission control signal has the gate-off voltage in the first period at the second frequency, and the first and third scan signals are toggled when the emission control signal has the gate-off voltage in the second period at the second frequency.

7. The display device of claim 6, wherein the second scan signal is not toggled in the second period at the second frequency.

8. The display device of claim 1, wherein at least one of the pixels further comprises a seventh transistor connected between the third node and the first initialization power line, and having a gate electrode to receive a fourth scan signal, and wherein the scan driver is configured to further supply the fourth scan signal.

9. The display device of claim 8, wherein:

the fourth scan signal is toggled in the first period at the first frequency; and the fourth scan signal is toggled in the first period at the second frequency, and is not toggled in the second period at the second frequency.

10. The display device of claim 8, wherein at least one of the pixels further comprises an eighth transistor connected between the fourth node and a second initialization power line, and having a gate electrode to receive the first scan signal, and wherein the power supply is configured to further supply a second initialization voltage to the second initialization power line.

11. The display device of claim 10, wherein the first, second, fourth, fifth, sixth, and eighth transistors are polysilicon semiconductor transistors, and the third and seventh transistors are oxide semiconductor transistors.

12. The display device of claim 10, wherein the first, second, fourth, fifth, sixth, and eighth transistors are P-type transistors, and the third and seventh transistors are N-type transistors.

13. A display device to operate in a unit of a first period when displaying first images at a first frequency and operate in a unit of the first period and at least one second period when displaying second images at a second frequency lower than the first frequency, the display device comprising:

pixels; and a first initialization power line to supply a first initialization voltage, wherein at least one of the pixels comprises:

a first transistor connected between a first node and a second node and having a gate electrode connected to a third node;

a second transistor connected between a data line and the first node and having a gate electrode to receive a first scan signal;

a third transistor connected between the second node and the third node and having a gate electrode to receive a second scan signal;

a fourth transistor connected between the first node and the first initialization power line or between the second node and the first initialization power line, and having a gate electrode to receive a third scan signal; and a fifth transistor connected between a first power source and the first node and having a gate electrode to receive an emission control signal;

a sixth transistor connected between the second node and a fourth node, and having a gate electrode to receive the emission control signal; and a light emitting element having a first electrode connected to the fourth node and a second electrode connected to a second power source, wherein the first to third scan signals are toggled in the first period when the first images are displayed at the first frequency, and wherein the first to third scan signals are toggled in the first period and the third scan signal is toggled in the second period when the second images are displayed at the second frequency.

14. The display device of claim 13, wherein the second scan signal is not toggled in the second period at the second frequency.

15. The display device of claim 13, wherein the first scan signal is toggled in the second period at the second frequency.

16. The display device of claim 13, wherein the emission control signal is toggled in the first period at the first frequency, and the emission control signal is toggle in each of the first and second periods at the second frequency.

17. The display device of claim 13, wherein at least one of the pixels further comprises a seventh transistor connected between the third node and the first initialization power line, and having a gate electrode to receive a fourth scan signal.

18. The display device of claim 17, further comprising a second initialization power line to supply a second initialization voltage, wherein at least one of the pixels further comprises an eighth transistor connected between the fourth node and the second initialization power line, and having a gate electrode to receive the first scan signal.

* * * * *